United States Patent [19]
Sherod et al.

[11] Patent Number: 5,423,599
[45] Date of Patent: Jun. 13, 1995

[54] WHEEL MASK

[75] Inventors: Curtis W. Sherod, 415 Buena Vista Ave., Anderson, S.C. 29624; Gary Carroll, Toccoa, Ga.

[73] Assignee: Curtis Sherod, Anderson, S.C.

[21] Appl. No.: 247,102

[22] Filed: May 20, 1994

[51] Int. Cl.⁶ .............................................. B60B 7/06
[52] U.S. Cl. ................................. 301/37.1; 301/37.36
[58] Field of Search ............... 301/37.1, 37.36, 37.42; 118/504, 505

[56] References Cited

U.S. PATENT DOCUMENTS

| | | | |
|---|---|---|---|
| 2,597,882 | 5/1952 | Lyon | 301/108 |
| 3,883,181 | 5/1975 | Dissinger | 301/37 |
| 4,784,440 | 11/1988 | Fair | 301/37.1 |
| 4,811,991 | 3/1989 | Moreno et al. | 301/37.1 |
| 4,874,206 | 10/1989 | Sampson | 301/37.1 |
| 4,955,670 | 9/1990 | Koller | 301/37.42 X |

FOREIGN PATENT DOCUMENTS 64-012901  1/1989  Japan ................................. 301/37.36

*Primary Examiner*—Russell D. Stormer
*Attorney, Agent, or Firm*—Gerald R. Boss; Cort Flint

[57] ABSTRACT

A detachable wheel mask for temporarily covering an entire wheel of an automobile during washing for the purpose of protecting the wheel from dirt while cleaning an associated tire is disclosed. The wheel mask includes a circular protective cover of a size corresponding with the wheel, a retaining element for fitting within a nip formed between the wheel rim and the tire to secure the protective cover to the wheel rim enclosing the wheel and a handle.

7 Claims, 2 Drawing Sheets

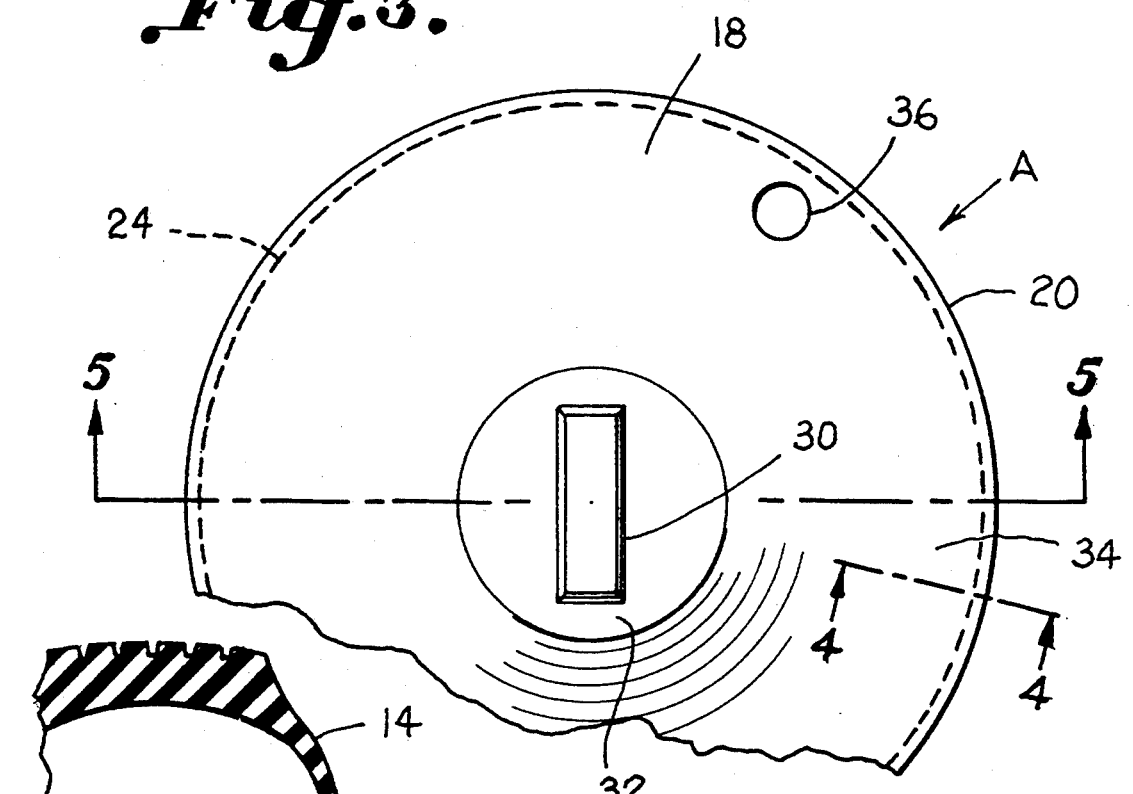

WHEEL MASK

BACKGROUND OF THE INVENTION

The invention relates to a wheel mask in general, and more particularly to a detachable wheel mask for temporarily covering an entire wheel of an automobile during washing of an automobile tire for the purpose of protecting the wheel from dirt while cleaning an associated tire.

Automobile wheels and wheel covers generally are very ornamental having intricate patterns including spokes and the like. A problem arises when an individual cleans the tires of the automobile. It is common practice to clean the wheels and wheel covers of an automobile while cleaning the automobile leaving the tires last because a cleaning solution other than that used to clean the car and the wheel covers is used to clean the tires. Dirt carried by fluid, such as water or Armor-all ®, runs down the tire and engages the wheel or wheel cover thereby sullying the wheel and wheel cover which had previously been washed. Accordingly, the dirt which runs off the tire and engages the wheel and/or wheel cover requires that the wheel and/or wheel cover be cleaned again extending an already onerous task.

Additionally, there are other situations in which it is desirable to have the wheel and/or wheel cover covered. For instance, in body shops tape is generally applied to cover wheel covers when the automobile is being painted. The placing and removal of tape over all wheels is a very time consuming task. Additionally, it is desirable to keep the wheel and/or wheel covers clean from dirt that may be present when transporting new vehicles or in the long term storage of such vehicles. Over all, many situations may arise where the covering of the wheel and/or wheel cover is desirable.

Ornamental wheel covers have been created in the past for permanent placement over the hub portion of the wheel. U.S. Pat. No. 3,883,181 to Dissinger discloses a decorative wheel cover for placement over the hub portion of a wheel or another embodiment to be received within the interior of the wheel construction. These wheel covers are designed to be displayed while the vehicle is in operation. U.S. Pat. No. 2,597,882 to Lyon also discloses a hubcap for permanent placement within the interior of a wheel hub. While these patents are for wheel covers themselves, they are not directed to fully enclosing a wheel for temporary placement while the tire is being cleaned.

Accordingly, an object of the present invention is to provide a wheel mask for temporarily covering an entire wheel of an automobile during washing of the wheel's tire for preventing dirt from the tire sullying the wheel;

Additionally, it is an object of the present invention to provide a detachable wheel mask that easily snaps on over the rim of the wheel to protect the wheel while also being easily removable from the wheel rim when the associated tire is cleaned;

Furthermore, it is an object of the present invention to provide a lightweight resilient wheel mask for temporarily covering an entire wheel of an automobile during washing for the purpose of protecting the wheel from dirt that is easy to manufacture.

SUMMARY OF THE INVENTION

The above objectives are accomplished according to the invention by providing a detachable wheel mask for temporarily covering an entire wheel of an automobile during washing for the purpose of protecting the wheel from dirt while cleaning an associated tire. The wheel mask includes a circular protective cover of a size corresponding with the wheel having an outer periphery which engages with an outer rim edge of the wheel rim to generally cover the wheel rim and wheel. The mask further includes a retaining element carried by the outer periphery of the circular protective cover for fitting within a nip formed between the wheel rim and the tire to secure the protective cover to the wheel rim and to enclose the wheel. Furthermore, the wheel mask includes a handle which is centrally carried by the circular protective cover which extends generally perpendicular to the cover for grasping the cover to place over the rim edge.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a partial perspective view of the wheel mask;

FIG. 4 is a sectional view taken along line 4—4 of FIG. 3;

FIG. 5 is a sectional end view taken along line 5—5 of FIG. 3; and

FIG. 6 is a cross sectional view of a wheel mask according to the invention engaging the nip formed between the wheel rim and the tire.

DESCRIPTION OF A PREFERRED EMBODIMENT

Referring now in more detail to the drawings, the invention will now be described in more detail.

Figure 1:
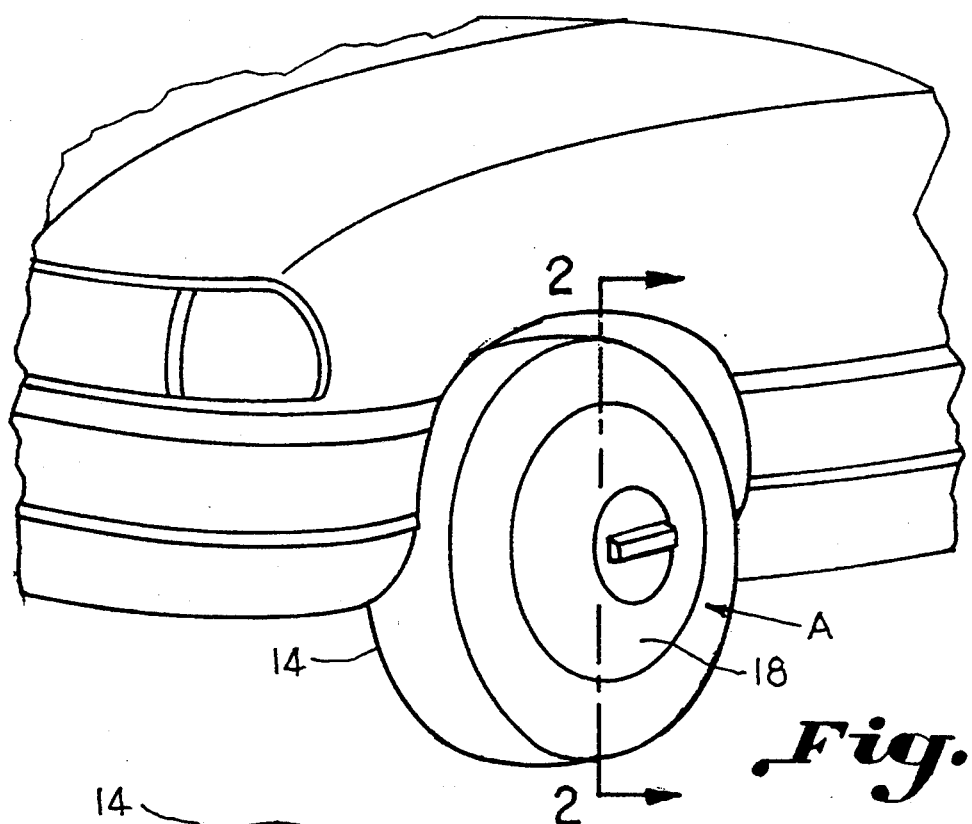
FIG. 1 is a perspective view of the wheel mask covering the wheel and rim of an automobile wheel assembly.
Figure 2:
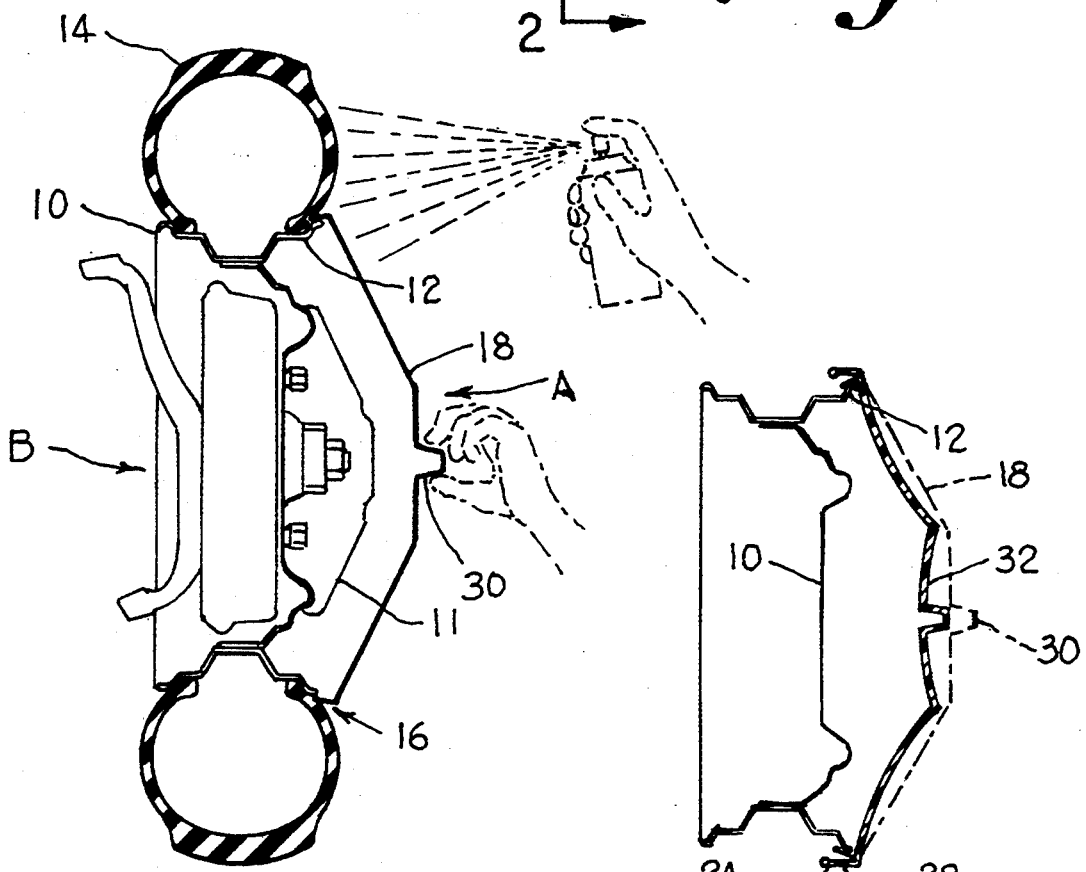
FIG. 2 is a sectional side view of the wheel mask protecting a wheel cover and being secured to the wheel assembly.

Referring now to FIGS. 1 and 2, a detachable wheel mask, designated generally as A, for temporarily covering an entire wheel of an automobile during washing is disclosed. Detachable wheel mask A is used in conjunction with a wheel assembly of an automobile, designated generally as B, which includes a wheel 10 having an outer wheel rim 12 and a tire 14 carried on the wheel defining a nip 16 between wheel rim 12 and tire 14. A wheel cover 11 covers the wheel hubs. Wheel cover 11 has an intricate design such as spokes and such, whereby dirt from the tire will cascade into the wheel's design sullying the wheel. It will be understood that some wheels do not utilize wheel covers but consist of intricate designs within the wheel itself. Wheel mask A is designed to fit over wheel rim 12 thereby covering wheel 10 and its intricate pattern or wheel cover 11 if present. Detachable wheel mask A temporarily covers entire wheel 10 during washing of tire 14 protecting wheel 10 from dirt runoff from the tire onto the wheel or in circumstances where paint is applied to the automobile. Wheel mask A protects wheel 10 from being erroneously painted.

Wheel mask A includes a circular protective cover 18 of a size corresponding with wheel 10. Circular protective cover 18 is of a size sufficient enough to cover corresponding wheel 10. Protective cover 18 includes an outer periphery 20 which engages with an outer rim edge 22 of wheel rim 12 enabling wheel mask A to generally cover wheel rim 12 and wheel 10. A resilient retaining element 24 is carried by outer periphery 20 which mates with outer rim edge 22 of wheel rim 12. Retaining element 24 is designed for fitting within nip 16 to secure protective cover 18 to wheel rim 12. Retaining element 24 may be bulbous providing a surface area for engaging wheel rim 12. In the preferred embodiment, retaining element 24 is comprised of a retaining rib 26 which protrudes outwardly from sidewall 28 to snap over and engage wheel rim 12 for a sure fit and retention. Attachment sidewall 28 extends outwardly from retaining element 24 to protective cover 18 and integrates with outer periphery 20. In the preferred embodiment attachment sidewall 28 is contiguous along outer periphery 20. Handle 30 extends generally perpendicular from circular protective cover 18.

As shown in FIGS. 2 and 5, protective cover 18 includes an inclined surface 34 which is concave with respect to wheel 10 about an imaginary center axis. The concave feature enables cover 18 to cover elements of wheel 10 which may extend outward beyond the profile of wheel rim 12. Inclined surface 34 extends from outer periphery 20 towards the center axis of wheel rim 12 terminating in a planar surface 32 which is generally parallel to wheel rim 12. Planar surface 32 is concentric with cover 18.

As shown in FIGS. 4, 5, and 6, to secure cover 18 with wheel rim 12, attachment sidewall 28 inwardly extends toward the center axis of cover 18 from outer periphery 20. As shown in FIG. 3, the angular nature of attachment sidewall 28 creates an inner circumference of wheel mask A which is smaller than the outer circumference of cover 18 and wheel rim 12. In the preferred embodiment, retaining rib 26 may be angularly contiguous along attachment sidewall 28 to provide continuous engagement of cover 18 with wheel rim 12.

In the preferred embodiment, wheel mask A is molded from plastic. Accordingly, the elements that comprise wheel mask A are of a resilient nature which deform when a force is placed on the mask, but will reestablish their initial shape once the force is removed. Since the inner circumference of wheel mask A is small than wheel rim 12, attachment sidewall 28 must deflect to a circumference approximately equal to wheel rim 12, in order for wheel mask A to be placed over wheel rim 12.

Figure 2A:
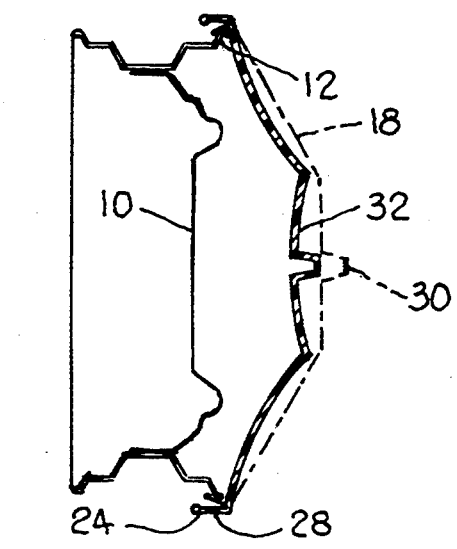

In operation, as shown in FIG. 2A, an inward force on handle 30 flexes planar surface 32 inwardly causing cover 18 to deform convexly which causes attachment sidewall 28 to spread over wheel rim 12. Accordingly, attachment sidewall 28 flexes to a circumference approximately equal to wheel rim 12 enabling retaining element 24 to slip over wheel rim 12. Upon the passing of retaining element 24 over wheel rim 12, the individual ceases pushing wheel mask A onto wheel rim 12. With the removal of the individual force and the resistance of wheel rim 12 on wheel mask A, protective cover 18 will retract to its original position. Accordingly, the angular structure of attachment sidewall 28 maintains sufficient pressure on retaining element 24 so that retaining element 24 remains within nip 16. After wheel mask A is in place, the individual may then clean tire 14 with a cleaning solvent.

As shown in FIGS. 3 and 5 handle 30 is centrally carried by cover 18 at planar surface 32. Though different configurations of handles will suffice, in the preferred embodiment handle 30 is symmetrical about the center axis of cover 18. The central location of handle 30 and its symmetrical design provides for the even deflection of attachment sidewall 28 for placing wheel mask A on wheel 10.

To remove wheel mask A from wheel 10, the individual grasps handle 30 and pulls wheel mask A. Upon the presence of a pulling force, retaining element 24 engages wheel rim 12 causing attachment sidewall 28 to deflect outward, thereby spreading retaining element 24 to a circumference slightly larger than wheel rim 12 enabling wheel mask A to be removed from wheel 10. The central location of handle 30 and its symmetrical design provides for the even transmittance of the pulling force resulting in the even deflation of attachment sidewall 28.

Wheel mask A is designed to cover all elements of wheel 10. Accordingly, if no elements of wheel 10 extend beyond the periphery of wheel 10 then wheel mask A may include cover 18 which is flat instead of inclined. The inclined profile of cover 18 is designed to cover those elements of wheel 10 which extend beyond the periphery of wheel 10. In some circumstances, the entire valve stem may extend beyond the periphery of wheel 10. Accordingly, wheel mask A may include a valve stem opening 36 which consists of perforations made within cover 18 enabling the user to remove the plastic defining valve stem opening 36 and place over the entire valve stem.

Thus, it can be seen that an advantageous construction can be had for a detachable wheel mask according to the invention where the wheel mask may readily be attached and removed from a wide variety of wheels. When installed over the wheel, the wheel mask protects the intricate design of the wheel from being sullied from any dirt or the like which may cascade onto the wheel upon the cleaning of the tire. After the tire's cleaning, the wheel mask may easily be removed for placement on another tire. The resilient nature of the wheel mask provides for easy positioning and removal during the cleaning of the tire.

While a preferred embodiment of the invention has been described using specific terms, such description is for illustrative purposes only, and it is to be understood that changes and variations may be made without departing from the spirit or scope of the following claims.

What is claimed is:

1. A detachable wheel mask for temporarily covering a wheel of an automobile during washing, painting, and storage for the purpose of protecting the wheel from dirt and the like, said wheel having an outer wheel rim and a nip formed between said wheel rim and said tire, wherein said wheel mask comprises:

a resilient circular protective cover of a size corresponding generally with said wheel, said protective cover including a general planar surface, an inclined surface extending from said planar surface, and said inclined surface terminating at an attachment sidewall having an outer periphery, said outer periphery engages an outer rim edge of said wheel rim to generally cover said wheel;

a retaining element carried by said attachment sidewall for fitting within said nip to secure said protective cover to said wheel rim and enclose said wheel;

said retaining element having a retaining rib angularly contiguous along said attachment sidewall for continuous engagement with said wheel rim; and a handle extending generally perpendicular from said planar surface, said handle centrally carried by said cover for deflecting said planar surface inwardly causing said inclined surface and attachment sidewall to deform inwardly in a convex manner causing said retaining element to spread over said wheel rim and fit within said nip;

whereby, said protective cover may be deflected to protect said wheel during the washing of said tire and removed from said wheel when the car is operational.

2. The mask of claim 1 wherein said handle is symmetrical providing for an even distribution of said force over said cover thereby evenly deflecting said attachment sidewall over said wheel rim.

3. The mask of claim 1 wherein said inclined surface is concave about a center axis with respect to said wheel for covering elements of the wheel extending beyond the profile of the wheel's rim.

4. The mask of claim 1 wherein said planar surface is generally parallel to said wheel.

5. The mask of claim 1 wherein said mask is of unitary plastic construction, whereas said force applied to said handle flexes said planar surface inward, flexing said inclined surface convexly deflecting said attachment sidewall outward enabling said retaining element to slip over said wheel mask.

6. The mask of claim 1 wherein said retaining rim includes a bulbous contour for sliding along the profile of said wheel rim to engage said nip between said wheel rim and said tire.

7. A detachable wheel mask for temporarily covering a wheel of an automobile during washing, painting, and storage for the purpose of protecting the wheel from dirt and the like, said wheel having an outer wheel rim and a nip formed between said wheel rim and said tire, wherein said wheel mask comprises:

a resilient circular protective cover of a size corresponding generally with said wheel, said protective cover having an outer periphery which mates with an outer rim edge of said wheel rim to generally cover said wheel rim and wheel; said cover including an inclined, concave surface about a center axis with respect to said wheel for covering elements of the wheel extending beyond the profile of the wheel's rim;

a peripheral retaining rib contiguously carried about said outer periphery of said protective cover for engaging said wheel rim for continuous engagement with said wheel rim;

said retaining rib having a bulbous contour for sliding along the profile of said wheel rim to engage said nip between said wheel rim and said tire;

a handle extending generally perpendicular from said cover, said handle centrally carried by said cover for evenly deflecting said concave surface inwardly to cause said retaining element to spread outwardly to fit over said wheel rim and engage within said nip when a force is applied to the handle by an individual;

whereby, said protective cover may be deflected to protect said wheel during the washing of said tire and removed from said wheel when the car is operational.

* * * * *